(12) United States Patent
Sinelli et al.

(10) Patent No.: US 11,009,065 B2
(45) Date of Patent: May 18, 2021

(54) LOCKING RING, REAR VIEW DEVICE AND VEHICLE

(71) Applicant: SMR Patents S.à.r.l., Luxembourg (LU)

(72) Inventors: Garry Sinelli, Troy, MI (US); Paul R. Henion, Troy, MI (US)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/688,366

(22) Filed: Nov. 19, 2019

(65) Prior Publication Data

US 2020/0088232 A1 Mar. 19, 2020

Related U.S. Application Data

(63) Continuation-in-part of application No. 16/134,377, filed on Sep. 18, 2018.

(30) Foreign Application Priority Data

Sep. 19, 2017 (DE) .................... 10 2017 121 737.1

(51) Int. Cl.
*F16C 11/10* (2006.01)
*B60R 1/076* (2006.01)
*E05D 11/10* (2006.01)

(52) U.S. Cl.
CPC .............. *F16C 11/10* (2013.01); *B60R 1/076* (2013.01); *E05D 11/1085* (2013.01);
(Continued)

(58) Field of Classification Search
CPC . B60R 1/06; B60R 1/076; F16C 11/04; F16C 11/10; F16C 11/103; E05D 11/1078; E05D 11/1085; E05D 2011/1035; Y10T 16/54028; Y10T 403/32368; Y10T 403/32418; Y10T 403/32426; Y10T 403/32442; Y10T 403/32451;
(Continued)

(56) References Cited

U.S. PATENT DOCUMENTS 5,039,118 A * 8/1991 Huang ...................... B62B 9/20
403/97
6,409,411 B1 * 6/2002 Crorey ................. B25J 15/0052
403/97
(Continued)

FOREIGN PATENT DOCUMENTS

DE 2648349 A1 * 2/1978 .............. F16C 11/10
DE 10223460 A1 * 12/2003 ......... E05D 11/1085
(Continued)

OTHER PUBLICATIONS

German Office Action dated Apr. 13, 2018 of German application No. 10 2017 121 737.1.

*Primary Examiner* — Josh Skroupa
(74) *Attorney, Agent, or Firm* — Jones Day

(57) ABSTRACT

A locking ring with a center axis for a rear view device includes one or more primary detents, a first set of secondary detents positioned on the one or more primary detents, and a second set of secondary detents arranged around the locking ring. A rear view device including the locking ring and a motor vehicle including the rearview device and the locking are also described.

20 Claims, 6 Drawing Sheets

(52) U.S. Cl.
CPC .. *E05D 2011/1035* (2013.01); *F16C 2326/01* (2013.01); *Y10T 16/54028* (2015.01); *Y10T 403/32459* (2015.01)

(58) Field of Classification Search
CPC ..... Y10T 403/32459; Y10T 403/32557; Y10T 403/589
USPC ......... 403/97, 103, 104, 106–108, 113, 320; 248/477, 478; 16/334
See application file for complete search history.

(56) References Cited

U.S. PATENT DOCUMENTS

| | | | |
|---|---|---|---|
| 7,878,477 B2* | 2/2011 | Courbon | B60R 1/0605 |
| | | | 403/97 |
| 8,544,151 B2 | 10/2013 | Courbon et al. | |
| 8,720,845 B2* | 5/2014 | Courbon | B60R 1/0617 |
| | | | 16/343 |
| 10,513,223 B2* | 12/2019 | Umino | B60R 1/076 |
| 10,766,419 B2* | 9/2020 | Bouaziz | B60R 1/076 |
| 2020/0001772 A1* | 1/2020 | Lettis | B60Q 1/0023 |

FOREIGN PATENT DOCUMENTS

| | | |
|---|---|---|
| DE | 10223460 A1 | 12/2003 |
| EP | 1439980 B1 | 7/2004 |
| WO | WO 98/40593 A1 | 9/1998 |

* cited by examiner

LOCKING RING, REAR VIEW DEVICE AND VEHICLE

CROSS-REFERENCE TO RELATED ART

This application is a continuation-in-part of U.S. patent application Ser. No. 16/134,377, filed Sep. 18, 2018, which claims the benefit of foreign priority to German Patent Application No. DE 10 2017 121 737.1, filed Sep. 19, 2017, each of which is herein incorporated by reference in its entirety for all purposes.

BACKGROUND

1. Field of the Invention

The following description relates to a locking ring for a rear view device, a rear view device with locking rings and a motor vehicle with a rear view device.

2. Related Art

Different functions and devices can be incorporated into and/or controlled with the help of rear view devices. These include functions and devices to enhance, extend and/or sustain the functionality of the rear view device during normal or extreme conditions. This can include heating and/or cooling means, cleaning means such as wipers, liquid and/or gaseous sprays, actuator means for moving the rear view device or parts of it, such as for example a display, a camera system and/or parts of a camera system, having for example lenses, filters, light sources, adaptive optics like deformable mirrors, sensors and/or mirrors, and/or actuator means for inducing movement of other objects, for example parts of the vehicle and/or objects surrounding the vehicle. Furthermore, it can include linear tracks and/or rotating wheels, like for example a filter wheel, for exchanging optical elements, including for example lenses, mirrors, light sources, sensors, adaptive optics like deformable mirrors and/or filters.

Examples for functions and devices incorporated into and/or controlled with the help of rear view devices include illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rear view devices can include, for example, a tiredness detection system, a microsleep detection system, a distance and/or velocity determination system such as a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, including, for example, a seat ejection system, a direction indicator, a blind spot indicator, an approach system, a strong braking system, an emergency braking system, a charging status indicator, a vehicle mode system, including, for example, a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

A camera module to be used in a rear view device may include a plurality of different optical elements, such as a variety of sensors and light sources, as well as housing parts. The housing of a camera module can be made out of plastic, metal, glass, any other suitable material and/or any combinations thereof and can be used in combination with the techniques described below to change or modify the properties of the material or the material surface. Housings are, for example, described in German patent application No. 102016108247. Further, the camera can include for example CCD or CMOS or light field sensors, as for example described in German patent application No. 102011053999. Also an area of the sensor can be reserved for different purposes, for example to detect a test beam, as described in U.S. Pat. No. 8,031,224, which is hereby incorporated by reference in its entirety for all purposes. The camera module can also be equipped with apparatuses for light intensity adjustment as described for example in U.S. patent application Ser. No. 14/809,509, which is hereby incorporated by reference in its entirety for all purposes, and light level intensifier tubes as described in U.S. patent application Ser. No. 09/771,140, which is hereby incorporated by reference in its entirety for all purposes. Still further, the camera module or a cover adapted to the camera module can be moved using different actuators, drives and/or a flexible track as, for example, described in German application No. 102016108247.3.

The camera module may also include cleaning elements to clean the optical element facing outwards and being exposed to the environment. The cleaning element can, for example, include wipers, brushes, lips, nozzles, fans and similar elements as are described in European patent application No. 14165197.6, European patent application No. 13163677.1, and European patent No. 1673260 corresponding to US patent application No. 2007/273971, each of which is hereby incorporated by reference in its entirety for all purposes. The cleaning devices are not limited in composition, and may, for example, include any fabric, elastomeric, sponge, brush, or combination of these. Special wiper elements including wiper arms, wiper blades, wiping cloth, wiping tissue and combinations thereof are described in European patent application No. 14165197.6. A reservoir for holding a cleaning liquid is described in European patent application No. 14165197.6. Such a reservoir can be attached to or integrated into the camera module to provide the cleaning liquid to the optical elements of the camera module. Different methods may be used to detect dirt or other obscurations preventing or reducing the functioning of the camera module, such as described in U.S. Pat. No. 8,395,514, European patent No. 1328141, and U.S. Pat. No. 8,031,224, each of which is hereby incorporated by reference in its entirety for all purposes. Also light sources can be installed or integrated into the camera module to increase the visibility of surrounding objects, measure distances and directions and detect dirt, such as described in U.S. Pat. No. 8,031,224, U.S. patent application No. 62/470,658, and U.S. patent application Ser. No. 09/771,140, each of which is hereby incorporated by reference in its entirety for all purposes.

Different heating means, like heating coils, heating devices integrated into the lens holder or the bezel, or other heating elements can be used to impede condensation and icing at the surface of optical elements as, for example, described in German patent application No. 102016108247.3, U.S. patent application No. 62/470,658, and German patent application No. 102016107545.0, each of which is hereby incorporated by reference in its entirety for all purposes.

A watertight seal against weather effects, as well as against the influence of washing processes with detergents, solvents and high pressure cleaners can be used on the housing of the camera module as described in U.S. patent application Ser. No. 13/090,127, which is hereby incorporated by reference in its entirety for all purposes. In another example, the housing can be made of a body including plastic and conductive material, where the conductive material is dispersed in the plastic material to form a conductive mass to allow a power source, preferably a DC voltage source, to connect via at least two electrodes to the body and heat the body accordingly, as described in German patent application No. 102016107545.0. Different types of fixings can be used to fix the camera module to the vehicle or other components, such as for example the snap-fit connection described in U.S. Pat. No. 8,979,288, which is hereby incorporated by reference in its entirety for all purposes.

Rear view devices are known from the prior art, in particular in the form of rear view mirrors. They generally include a base, which is affixed to a vehicle, and a head which carries at least a mirror glass and/or a camera and often additional elements such as side turn indicators or the like. The head is usually mounted pivotally movable with respect to the base. This allows the head to move out of the way in case of a minor collision, thereby preventing damage to the head or injury to pedestrians who get hit by the rear view device. Furthermore, the head can be pivoted, either manually or by means of an automatic folding system, from an operating position, in which the rear view device enables the driver of the vehicle to receive a view in particular to the back, to a parking position, in which the head is folded against the side of the vehicle. This reduces the lateral extent of the vehicle with the mirror in the parking position and prevents accidental damage to the mirror of a parked vehicle.

Shape memory alloys (SMA) are used for various functions with rear view devices. US patent application No. 2016/347252, which is hereby incorporated by reference in its entirety for all purposes, relates to an actuator device for a rear view device of a motor vehicle having at least one retaining element; at least one adjusting element which can be transferred into a plurality of functional positions, in particular from a parking position into at least one operating position, at least one driving means which includes at least one shape-memory element which is, in particular, in the form of a wire, which extends between the retaining element and the adjusting element and can be or is secured to both, where the extension of said shape-memory element can be modified on being actuated, in particular on being electrically energized, and by means of the modification of the extension of which the at least one adjusting element can be transferred from one functional position into another functional position, in particular from the parking position into the operating position or vice versa, at least one heat-conducting means which lies in contact with the driving means at least in the end position of the adjusting element, and where at least one switching means, by means of which the at least one driving means and the at least one heat-conducting means can be or are arranged with respect to one another with no contact in the basic position of the adjusting element and/or by means of which the at least one driving means and the at least one heat-conducting means can be or are arranged touching one another at least in sections at least in the end position of the adjusting element. A further actuator for an exterior rear view mirror of a vehicle is known from European patent application No. 2781743 and has at least one actuator pin, at least one drum body enclosing a cavity, in which the actuator pin can be arranged or is arranged in a non-rotational manner, at least one clamping means which includes at least one shape-memory element which can be fixed or is fixed to the drum body and with which the drum body can be moved in a first rotational direction, and at least one return means which includes at least one shape-memory element which can be fixed or is fixed to the drum body and with which the drum body can be moved in a second rotational direction, characterized in that the clamping means and/or the return means can be fixed or are fixed on a winding portion of the drum body and in the winding portion of the drum body at least quarter of a winding, in particular at least half a winding, in particular an entire winding, in particular several windings are applied.

In order to secure the head in its respective positions relative to the base, the head and base usually include complementary locking elements. These can take the form of locking rings which are positioned around the pivot axis and fixed relatively to the head and base, respectively. In the operating position and/or the parking position, complementary detents of the locking rings are interlocked with each other, thus preventing accidental movement. Only if a certain amount of force is exerted around the pivot axis, the detents unlock and the mirror head can be moved between the respective positions.

The force used for unlocking the head acts primarily on the detents and causes frictional wear. This leads to a degradation of the locking mechanism over time and can, in particular, negatively affect the stability of the mirror head in its operating position.

U.S. Pat. No. 8,544,151 describes a pivoting detent joint with two detent rings, each of which includes multiple detents which are distributed in an asymmetrical manner around the circumference of the detent rings in order to define multiple locking positions. Such an arrangement requires that the depth of detents at each of the locking locations be the same, thus the effort to move the mirror head out of any locking location is the same which leads to greater wear on the system. Due to the asymmetric spacing of the detents, this also limits the locations of the multiple locking positions.

It is thus one aspect to provide locking rings and rear view devices which are particularly resilient against frictional wear and flexibility of design. As a result of wear during the lifecycle of the device, the detents may catch one another while locking rings rotate with respect to each other. For example, the height of primary detents may be reduced as the device wears which may cause secondary detents or portions thereof to hit against each other while the locking rings rotate with respect to each other. In another aspect, vehicles with such rear view devices are described.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. In one aspect, a mounting assembly for an exterior attachment device which offers particularly good protection against theft of such external attachment devices is described.

In an aspect, a locking ring with a center axis for a rear view device includes one or more primary detents which extend radially from a first radial distance from the center axis to a second radial distance from the center axis, the one or more primary detents arranged in a circumferentially equidistant manner around the center axis; a first set of secondary detents positioned on the one or more elevated primary detents which extend radially from a first radial distance from the center axis to a third radial distance from the center axis, the third radial distance being smaller than the second radial distance, the first set of secondary detents being arranged around the locking ring; and a second set of secondary detents, positioned on a planar recessed elevation, which extends radially from the first radial distance from the central axis to the third radial distance from the central axis, the second set of secondary detents being arranged around the locking ring.

In another aspect, a locking ring for a rear view device includes one or more primary detents elevated by a first height from a planar recessed elevation or a raised ring portion; a first set of secondary detents forming depressions on the one or more primary detents; and a second set of secondary detents forming protrusions which are raised by a second height from the planar recessed elevation or the raised ring portion of the locking ring, wherein the difference between the first height and the second height is between 0.1 mm and 1.5 mm.

In a further aspect, a rear view device, in particular an external rear view mirror for a vehicle, includes a base portion and a head portion, wherein the head portion is pivotable relative to the base portion about a pivot axis, and wherein the base portion includes a first locking ring arranged coaxially with the pivot axis and the head portion includes a second locking ring arranged coaxially with the pivot axis, and wherein the first locking ring includes a first set of locking elements, which extend radially from a first radial distance r1 from the pivot axis to a second radial distance r2 from the pivot axis, and which are arranged in a plurality of first groups includes at least one first locking element each, wherein the first groups are arranged in a circumferentially equidistant manner around the first locking ring; and the first locking ring includes a second set of locking elements, which extend radially from the first radial distance r1 from the pivot axis to a third radial distance r3 from the pivot axis, wherein the third radial distance r3 is smaller than the second radial distance r2, and which are arranged in a plurality of second groups including at least one second locking element each, wherein the second groups are arranged in a circumferentially equidistant manner around the first locking ring; and the second locking ring includes a third set of locking elements, which is complementary to the first set of locking elements, and a fourth set of locking elements, which is complementary to the second set of locking elements.

The locking rings may be fixedly arranged with the base portion part and the head portion part of the pivot axis arrangement. The coaxial arrangement is to be understood such that a rotational symmetry axis of each locking ring coincides with the pivot axis.

In a locked position of such a rear view device, the first and second sets of locking elements may interlock with the third and fourth set of locking elements. An unlocking force exerted on the rear view device therefor may be distributed over all locking elements and distributed completely symmetrically over the locking rings. This provides an optimal load distribution, reduces wear in general and avoids uneven wear of the locking rings in particular.

The locking elements of the first and second set of locking elements may be raised with respect to a surface of the first locking ring. In other words, the locking elements of the first and second set may form detents, teeth, catches or lugs, which provide for a stable locking of the rear view device in its locked position.

The locking elements of the third and fourth set of locking elements may be recessed with respect to a surface of the second locking ring. The third and fourth set of locking elements may thus form complementary recesses or notches, which can stably hold the teeth or catches of the first and second set of locking elements.

This may also be reversed, i.e. the raised locking elements may be located on the second locking ring, while the recessed locking elements may be located on the first locking ring.

The locking elements may include a substantially V-shaped profile in circumferential direction. The flanks of such a V-shaped profile may provide a particularly large surface to distribute the unlocking forces upon, so that this embodiment is particularly resistant to wear. A substantially V-shaped profile may be understood to include two angled flanks which either connect directly in a point or via a short, flat or rounded intermediate portion. Such a profile can also be compared to a detent geometry leading to locking rings with detent ramps.

The first locking ring may include an annular base portion and a recess portion recessed axially relative to the base portion, wherein the recess portion extends in a radial direction from the first radial distance r1 to the second radial distance r2 and wherein the first and second set of locking elements are arranged on the recess portion. The recess portion can receive at least part of the second locking ring, thereby not only providing the desired locking effect, but also stabilization and guidance in the radial direction.

The second locking ring may include an annular base portion and a ring portion extending axially from the base portion, wherein the ring portion extends in a radial direction from the first radial distance r1 to the second radial distance r2 and wherein the third and fourth set of locking elements are arranged on the ring portion. The ring portion of the second locking ring may be inserted into the recess portion of the first locking ring, thereby providing a particularly stable arrangement.

In a first operational position of the rear view device, the first and second set of locking elements may be mutually engaged with the third and fourth set of locking elements. The first operational position of the rear view device may be the operating position which enables a rearward view for a driver to be taken. Since all locking elements are interlocked or mutually engaged in this position, it may be particularly stable. This may help to avoid an unwanted unlocking of the rear view device due to vibrations caused by the motion of the vehicle the device is attached to.

The second locking ring may include a fifth set of locking elements, which extend radially from the second radial distance r2 from the pivot axis to the third radial distance r3 from the pivot axis, and which are arranged in a circumferentially equidistant manner around the second locking ring, and which have a smaller axial extent than the locking elements of the third and fourth set of locking elements.

The fifth set of locking elements may provide a different locking position for the rear view device. Due to the shallower axial extent of the fifth set of locking elements, the unlocking force for this particular locking position may be lower than the unlocking force from the main locking position defined by the interaction of the first to fourth set of locking elements. This causes less wear to occur during that unlocking process. The different locking position may, for example, be used to lock the rear view device in a parking position where an accidental unlocking due to vibrations is not to be expected.

In a second operational position of the rear view device, the first set of locking elements may be mutually engaged with the fifth set of locking elements.

The amount of locking elements per group may vary, but preferably is between 3 to 5.

In an example, the number of detent ramps present may provide an advantage. That is, the area or linear length of the engaging detent ramps may be greatly increased. This significantly reduces the load applied to each ramp as the head portion is folded relative to the base portion, thus, reducing the wear for longer life of the detent system and, thus, the locking rings.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The term "rear view" is here defined as a view of the surrounding area, which is not in the field of view of a driver, i.e. the directions opposing, left, right, below and above of the viewing direction, but can also include the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Figure 1:
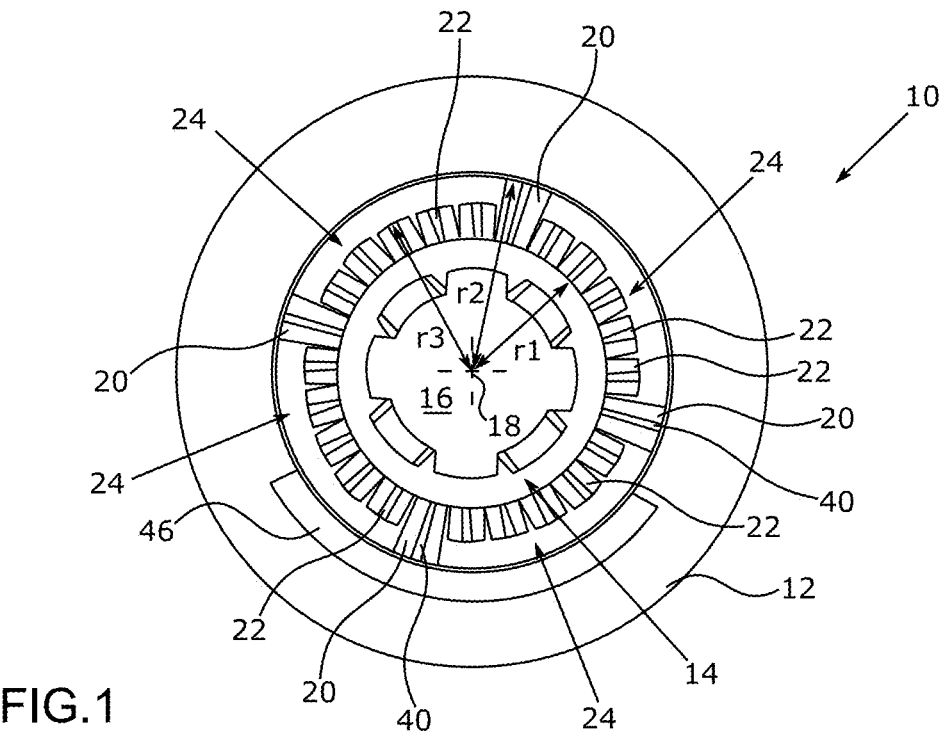
FIG. 1 is a diagram illustrating a top-down view of an example of a locking ring.
Figure 2:
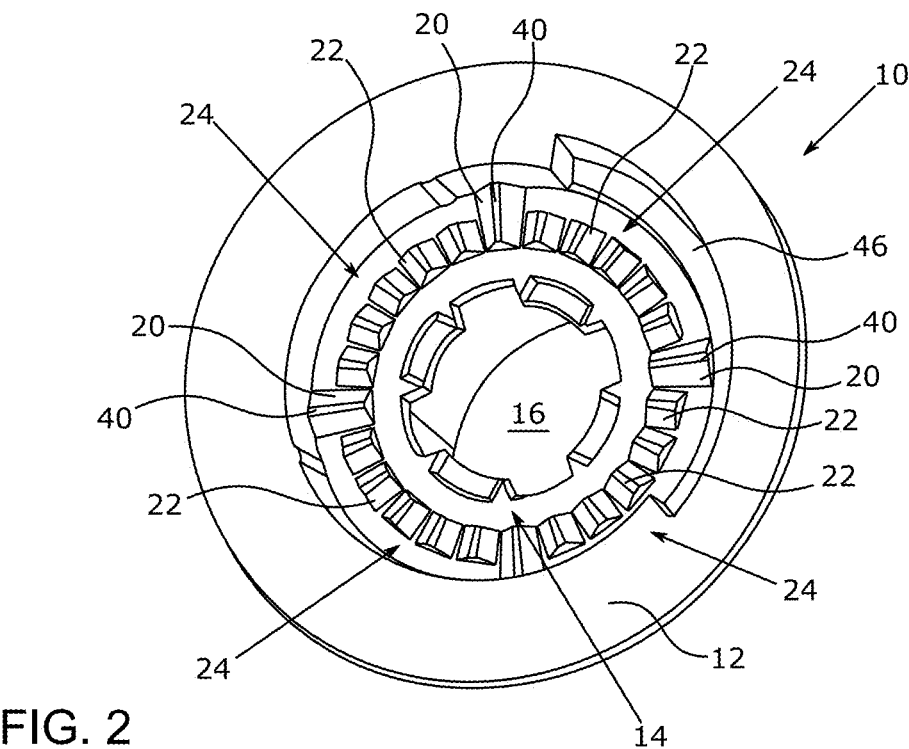
FIG. 2 is a diagram illustrating a perspective view of the locking ring of FIG. 1.

A first locking ring 10, as shown in FIGS. 1 and 2, includes an annular base portion 12 and a recess portion 14 formed around a central opening 16 and is substantially radially symmetrical around a center axis 18.

A first set of locking elements 20 is formed on the recess portion 14. The locking elements 20 are symmetrically distributed with an angular distance of 90° and extend from a radial distance r1 from the center axis 18 to a radial distance r2 from the center axis 18.

Second locking elements 22 are formed between the first locking elements 20 in four groups 24 of five locking elements 22 each, the groups being distributed in a radially symmetrical fashion around the recess portion 14. The second locking elements 22 extend from the first radial distance r1 to a third radial distance r3, which is shorter than the radial distance r2.

In this example, both the first locking elements 20 and the second locking elements 22 are formed in the shape of raised detents with a V-shaped cross-sectional profile, as can be seen in FIG. 2.

Figure 3:
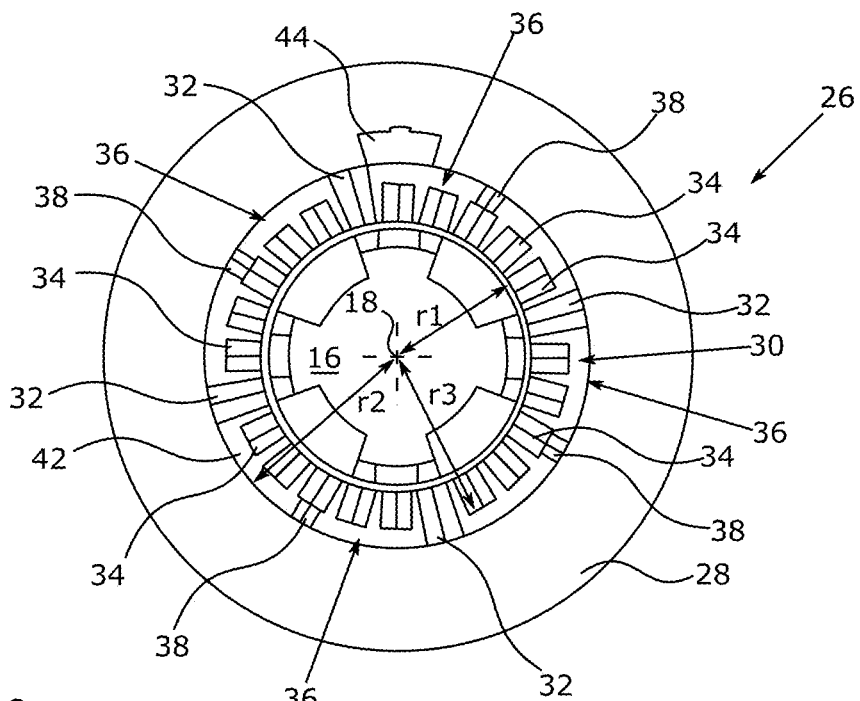
FIG. 3 is a diagram illustrating a top-down view of another example of a locking ring.
Figure 4:
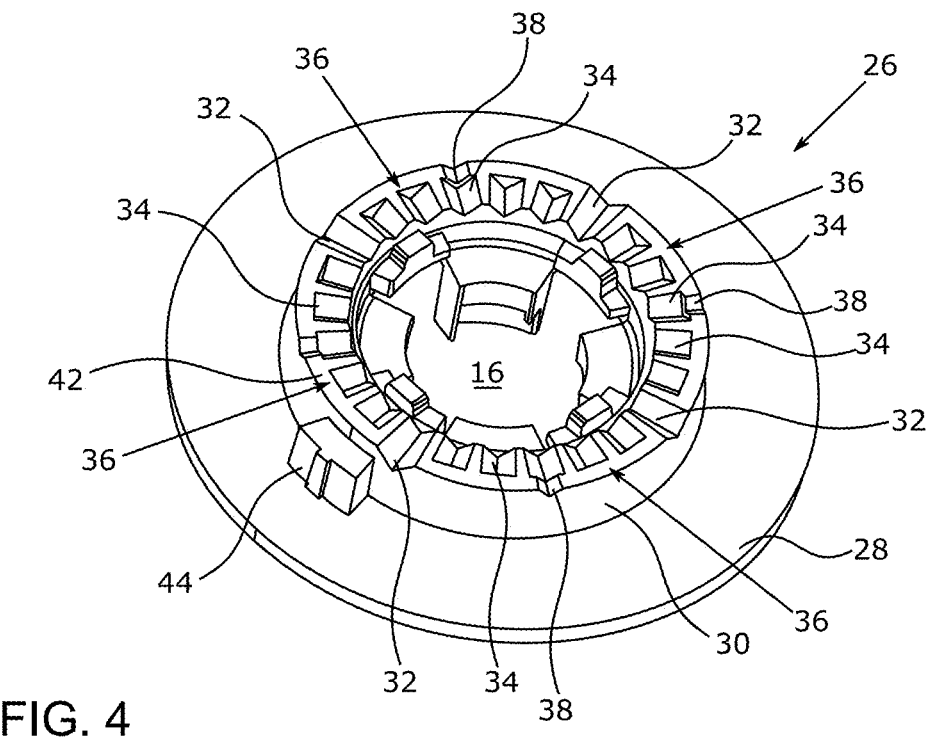
FIG. 4 is a diagram illustrating a perspective view of the locking ring of FIG. 3.

In another example as shown in FIGS. 3 and 4, a second locking ring 26 includes an annular base portion 28 and a ring portion 30 formed around the central opening 16, and is substantially radially symmetric around a center axis 18. The ring portion 30 may be raised with respect to the base portion 28.

In this example, a third set of locking elements 32 is formed on the ring portion 30. The locking elements 32 are symmetrically distributed with an angular distance of 90° and extend from a radial distance r1 from the center axis 18 to a radial distance r2 from the center axis 18.

In addition, fourth locking elements 34 may be formed between the third locking elements 32 in four groups 36 of five locking elements 34 each, the groups being distributed in a radially symmetrical fashion around the ring portion 30. The fourth locking elements 34 may extend from the first radial distance r1 to a third radial distance r3, which is shorter than the radial distance r2.

The second locking ring 26 may further include fifth locking elements 38 which are symmetrically distributed with an angular distance of 90° and extend from a radial distance r2 from the center axis 18 to a radial distance r3 from the center axis 18. Each fifth locking element 38 is aligned with a corresponding fourth locking element 34. The fifth locking elements 38, however, may be more shallow with respect to the axial direction of the locking ring 26.

The third locking elements 32, the fourth locking elements 34 and the fifth locking elements 38 may be formed in the shape of recessed detents with a V-shaped cross-sectional profile, as illustrated in FIG. 4.

In a rear view device (not shown), for example in a rear view mirror for a vehicle, the first locking ring 10 may be affixed to a base part of a pivot axis between a mirror base and a mirror head, while the second locking ring 26 may be affixed to a head part of the pivot axis, or vice versa.

In an operational position, in which the rear view mirror provides a rearward view to a driver of the vehicle, the first locking elements 20 may be engaged with the third locking elements 32 and the second locking elements 22 may be engaged with the fourth locking elements 34 in order to hold the mirror head secure in its operational position. The ring portion 30 of the second locking ring 26 may be inserted into the recess portion 14 of the first locking ring 10, providing radial stability to the arrangement.

In an example, if a rotational force is exerted on the mirror head, either manually by a user or by means of an electric drive, the locking elements 20, 22, 32, 34 disengage and the second locking ring 26 is lifted in axial direction relative to the first locking ring 10. The locking rings 10, 26 can now be freely rotated relative to each other. During the rotation, the tips 40 of the first locking elements 20 glide on a rim portion 42 of the ring portion 30 of the second locking ring 26.

After a degree of rotation 45, the first locking elements 20 may reach the fifth locking elements 38 and interlock with them. This may define a second fixed position of the rear view mirror, preferably a parking position, in which the rear view mirror is folded against the side of the vehicle.

For example, the movement can be reversed by exerting a rotational force on the mirror head in the opposite direction. Since the fifth locking elements 38 are shallower than the third locking elements 32, less force may be needed to disengage the locking elements 32, 38. The mirror head can now be moved back to its normal operating position, in which the first locking elements 20 are engaged with the third locking elements 32 and the second locking elements 22 are engaged with the fourth locking elements 34.

In order to limit the movement range of the mirror head, the second locking ring 26 may include a stopper 44 which inserts into a guiding groove 46 of the first locking ring 10, thus defining the possible rotational movement range of the locking rings 10, 26 relative to each other.

Figure 5:
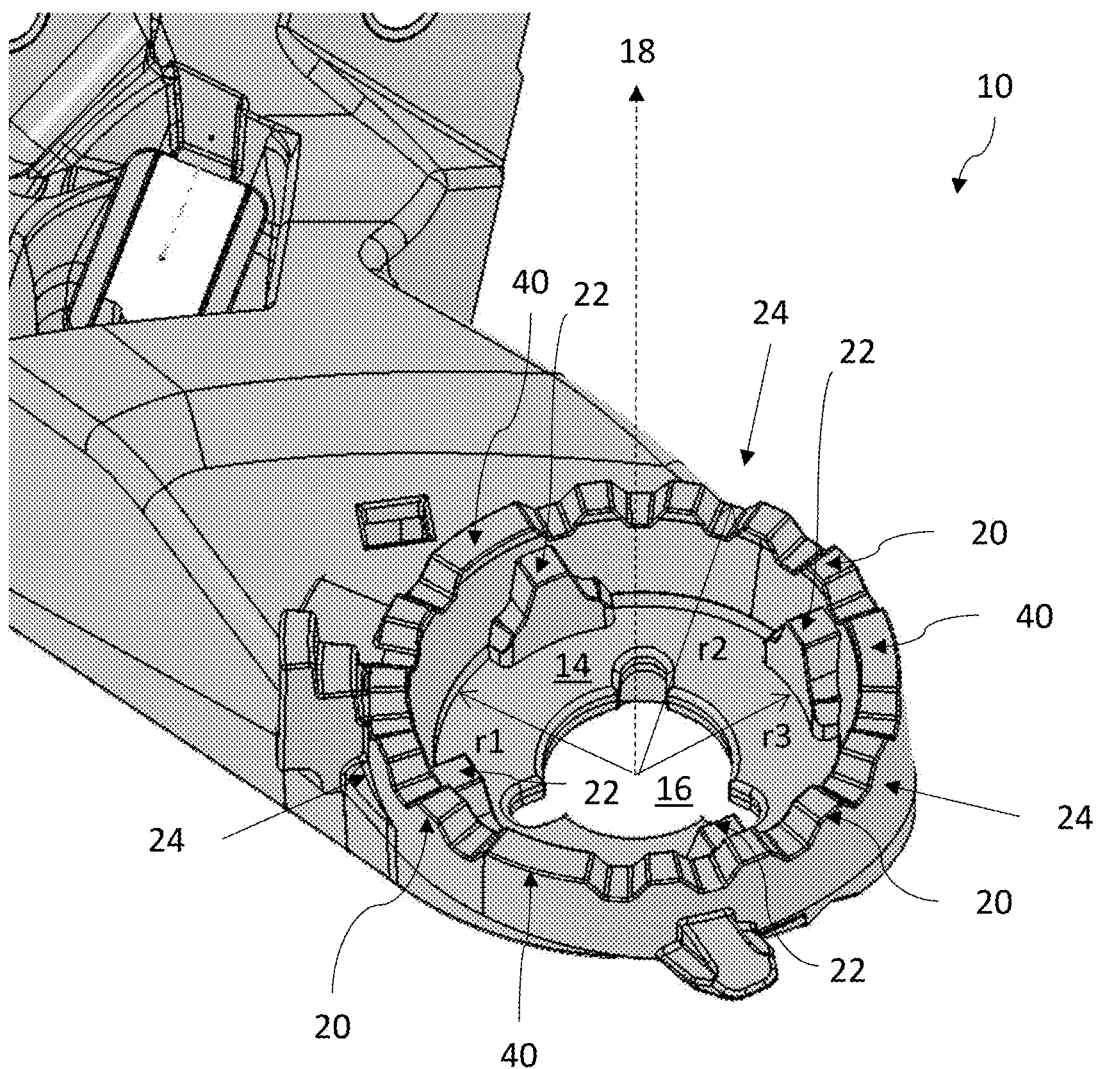
FIG. 5 is a diagram illustrating a further example of a locking ring.

Another first locking ring 10, as shown in FIG. 5, may include an annular base portion 12 and a recess portion 14 formed around a central opening 16 and may be substantially radially symmetric around a center axis 18.

In this example, a first set of locking elements 20 is formed on the recess portion 14. The locking elements 20 are arranged in three groups 24 each including four locking elements 20. The groups 24 may be symmetrically distributed with an angular distance of 120° and extend from a radial distance r1 from the center axis 18 to a radial distance r2 from the center axis 18. The groups 24 of first locking elements may be separated from each other by a tip 40. The tip 40 may have a larger extension in circumferential direction around the center axis 18 compared to a single locking element in the group of locking elements 24. However, the group of first locking elements 24 may have a larger extension in a circumferential direction around the center axis 18 compared to a single tip 40. The width of the first locking elements 20 and the tips 40 in a radial direction may be equal.

Second locking elements 22 may be formed in front of the first locking elements 20 in four groups. Due to three groups of first locking elements 20 and four second locking elements 22, the position of the second locking elements 22 changes relative to the position of the first locking elements 20 around the first locking ring 10. For example, the second locking elements 22 extend from the first radial distance r1 to a third radial distance r3, which is shorter than the radial distance r2. The width of the first and second locking elements 20, 22 in radial direction may be equal.

The shape of the first locking elements 20 may include rising and falling flanks, each with a preferably parallel section between the flanks. The shape of the second locking elements may correspond to a tooth with a flat highest side preferably parallel to the flat sections of the first elements.

The second locking ring 26 is not shown here for the embodiment of FIG. 5 but may include a shape and structure adapted to fit together with the locking ring 10.

In a rear view device (not shown), for example in a rear view mirror for a vehicle, the first locking ring 10 according to FIG. 5 may be affixed to a base part of a pivot axis between a mirror base and a mirror head, while the second locking ring 26 may be affixed to a head part of the pivot axis, or vice versa.

Figure 6:
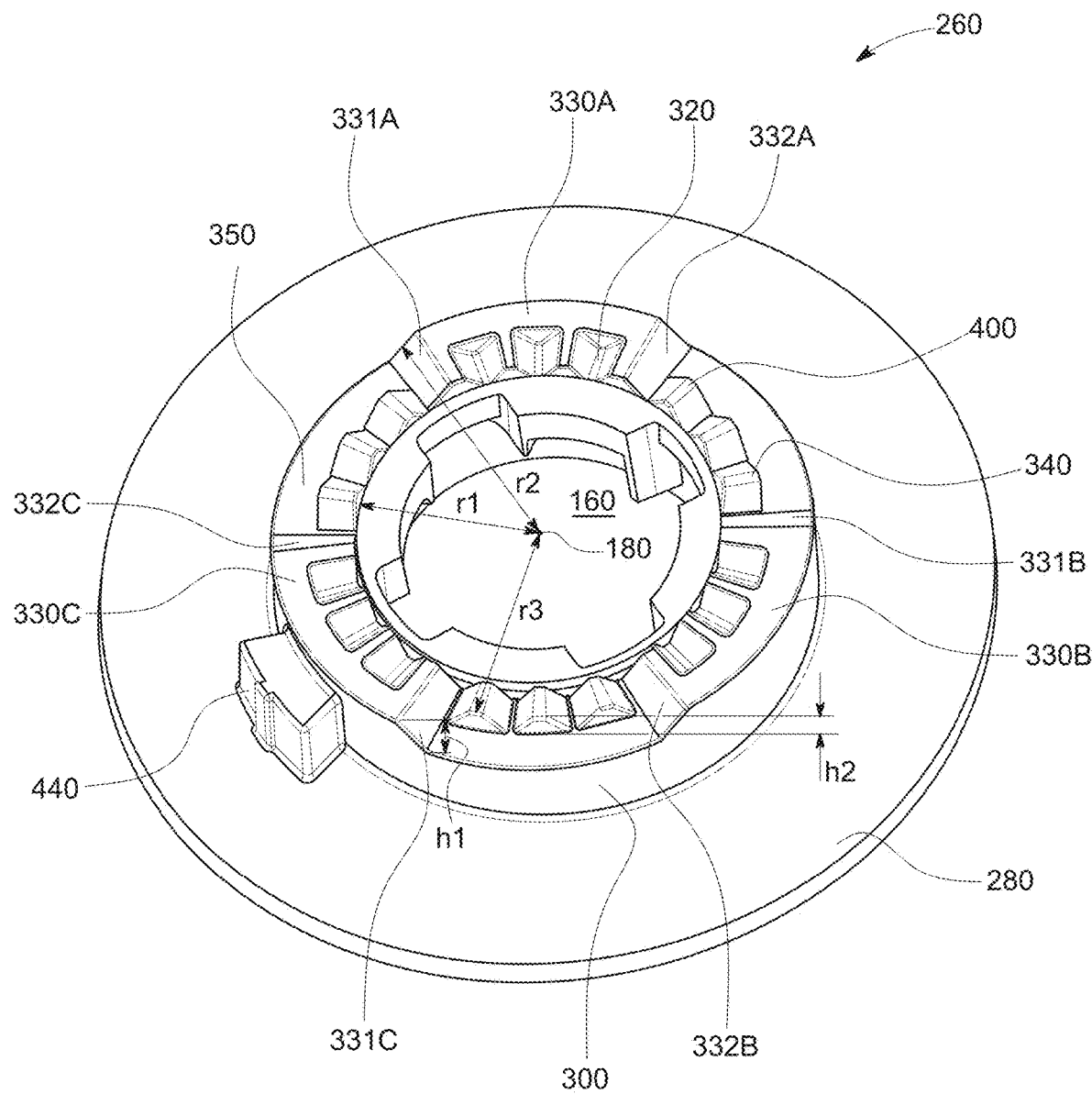
FIG. 6 is a diagram illustrating a perspective view of another example of a locking ring.

In an example, as illustrated in FIG. 6, a base locking ring 260 includes an annular base portion 280 and a ring portion 300 formed around the central opening 160, and is substantially radially symmetric around a center axis 180. The ring portion 300 may be raised with respect to the base portion 280.

The base locking ring 260 includes primary detents 330A, 330B, 330C and alternating sets of secondary detents 320, 340. The primary detents 330A, 330B, 330C comprise elevated surfaces. Between these elevated primary detents is the planar recessed elevation 350 of the base locking ring 260. Each of the primary detents 330A, 330B, 330C includes a pair of detent ramps 331A, 332A, 331B, 332B, 331C, 332C. For example, a first primary detent 330A includes a pair of detent ramps 331A, 332A, a second primary detent 330B includes a pair of detent ramps 331B, 332B, and a third primary detent 330C includes a pair of detent ramps 331C, 332C. The first set of secondary detents 320 are depressed secondary detents 320 formed on the primary detents 330A, 330B, 330C, and the second set of secondary detents 340 are raised secondary detents 340 formed on the planar recessed elevation 350.

In this example, the first set of secondary detents 320 include three secondary detents 320 on each primary detent 330A, 330B, 330C. Each of the three primary detents 330A, 330B, 330C include three depressed secondary detents 320 for a total of nine depressed secondary detents 320. However, it should be appreciated than any number of secondary detents 320 or primary detents 330A, 330B, 330C may be used. For example, three, six, any multiple of three, or any number of total secondary detents 320 may be used. The depressed secondary detents 320 are symmetrically distributed and extend from a radial distance r1 from the center axis 180 to a radial distance r3 from the center axis 180. The primary detents 330A, 330B, 330C, on which the secondary detents 320 are formed, extend from a radial distance r1 from the center axis 180 to a radial distance r2 from the center axis 180.

The second set of secondary detents 340 are formed on the planar recessed elevation 350 between the primary detents 330A, 330B, 330C. In this example, three groups of raised secondary detents 340 are formed in a radially symmetrical fashion. Each group or set of raised secondary detents 340 includes three raised secondary detents 340 for a total of nine secondary detents 340. However, it should be appreciated than any number of the second set of secondary detents 340 may be used. For example, three, six, any multiple of three, or any number of total secondary detents 340 may be used. Unlike the first set of secondary detents 320 which are formed on elevated detents 330A, 330B, 330C, the second set of secondary detents 340 are formed directly on the planar recessed elevation 350. Like the first set of secondary detents 320, the second set of secondary detents 340 extend from the radial distance r1 from the center axis 180 to the radial distance r3 from the center axis 180.

In this example, the first set of secondary detents 320 are formed in the shape of depressed detents with a substantially V-shaped cross-sectional profile. The first set of secondary detents 320 are depressed into the elevated surface of the primary detents 330A, 330B, 330C. The second set of secondary detents 340 are formed in the shape of raised detents with a substantially V-shaped cross-sectional profile. The second set of secondary detents 340 are raised from the surface of the planar recessed elevation 350.

In addition, the primary detents 330A, 330B, 330C, the first set of secondary detents 320, and the second set of secondary detents 340 may include a flat surface in part, and ramped surfaces. The shapes, sizes, and angles of the flat surfaces and ramped surfaces for any of the primary and secondary detents 320, 330A, 330B, 330C, 340 may be as described by U.S. patent application Ser. No. 10/589,708, filed Feb. 18, 2015 and now U.S. Pat. No. 7,490,945, which is hereby incorporated by reference in its entirety for all purposes.

In a preferred example, a height h1 of the surface of the primary detents 330A, 330B, 330C is greater than a height h2 of each tip 400 of the raised secondary detents 340. In other words, the elevation of the elevated detents 330A, 330B, 330C, as measured from the surface of the ring portion 300, is greater than the elevation of the raised secondary detents 340, as measured from the surface of the ring portion 300. The difference between the height h1 of the primary detents 330A, 330B, 330C and the height h2 of the raised secondary detents 340 can range from 0.1 mm to 1.5 mm. In a preferred example, the difference between the height h1 and the height h2 is 0.5 mm.

Figure 7:
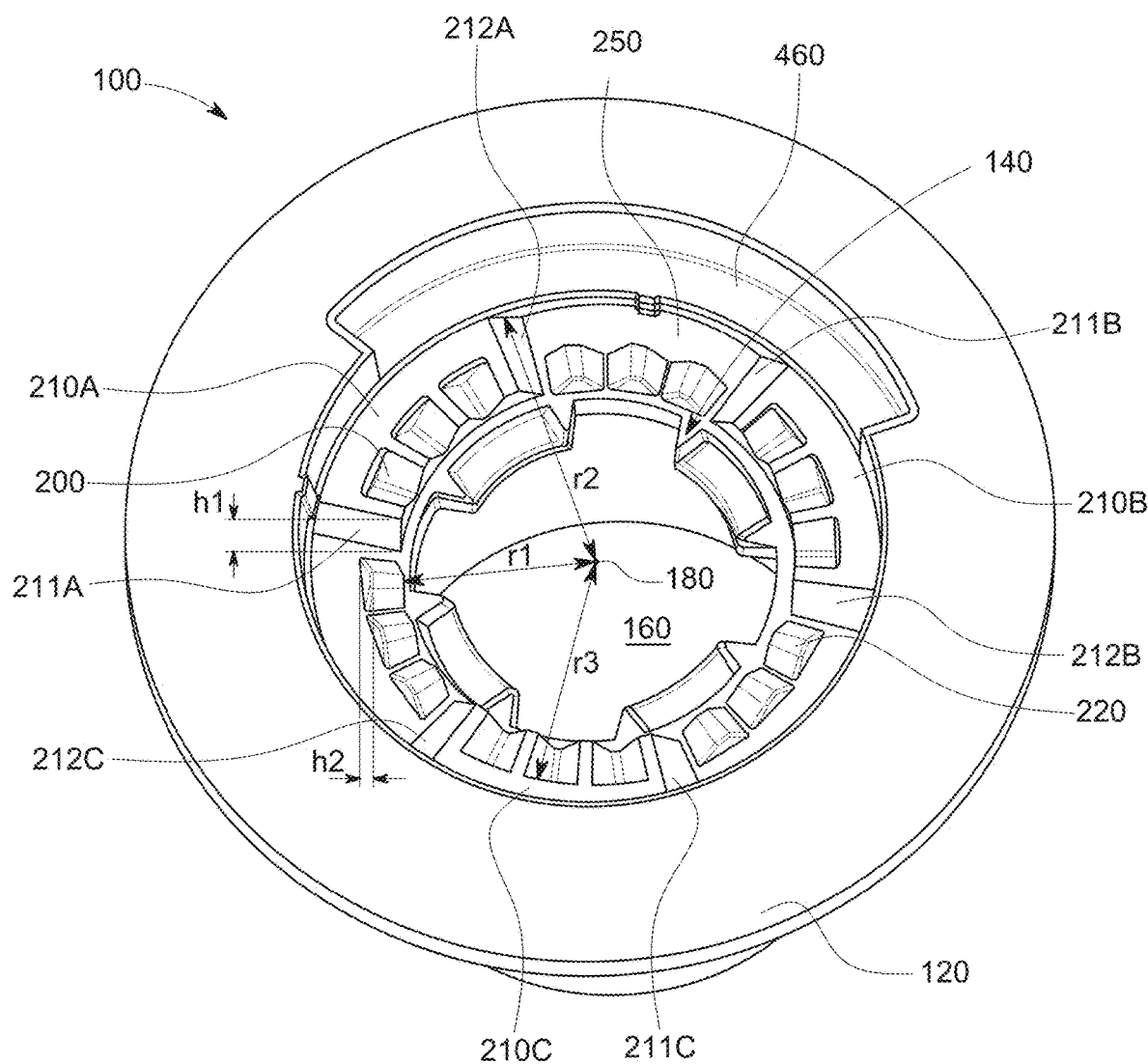
FIG. 7 is a diagram illustrating a perspective view of another example of a locking ring for mating with the locking ring of FIG. 6.

Another example of a case locking ring 100, as illustrated in FIG. 7, includes an annular case portion 120 and a recess portion 140 recessed axially from the annular portion 120. The recess portion 140 is formed around a central opening 160 and is substantially radially symmetrical around a center axis 180.

In this example, a third set of secondary detents 200 may be the same in shape and configuration as the first set of secondary detents 320 of the base locking ring 260, and may be formed on primary detents 210A, 210B, 210C. The primary detents 210A, 210B, 210C may be the same in shape and configuration as the primary detents 330A, 330B, 330C of the base locking ring 260. In this example, the primary detents 210A, 210B, 210C are elevated from the planar recessed elevation 250 of the recess portion 140. As with the primary detents 330A, 330B, 330C of the base locking ring 260, each of the primary detents 210A, 210B, 210C of the case locking ring 100 includes a pair of detent ramps 211A, 212A, 211B, 212B, 211C, 212C. Further, in this example, a fourth set of secondary detents 220 may be the same in shape and configuration as the second set of secondary detents 340 of the base locking ring 260. In this example, the fourth set of secondary detents 220 are formed on the planar recessed elevation 250 of the recess portion 140.

In a preferred example, the same dimensions and characteristics of the first set of secondary detents 320, the primary detents 330A, 330B, 330C, and the second set of secondary detents 340 may apply for the third set of secondary detents 200, the primary detents 210A, 210B, 210C, and the fourth set of primary detents 220 including the radial distances r1, r2, r3 and heights h1, h2 described in reference with the base locking ring 100.

In a rear view device (not shown), for example in a rear view mirror for a vehicle, the base locking ring 260 may be affixed to a base part of a pivot axis between a mirror base and a mirror head, while the case locking ring 100 may be affixed to a head part of the pivot axis, or vice versa.

In an operational position, in which the rear view mirror provides a rearward view to a driver of the vehicle, the first set of secondary detents 320 may be engaged with the fourth set of secondary detents 220 and the second set of secondary detents 340 may be engaged with the third set of secondary detents 200 in order to hold the mirror head secure in its operational position. The ring portion 300 of the base locking ring 260 may be inserted into the recess portion 140 of the case locking ring 100, providing radial stability to the arrangement.

In an example, if a rotational force is exerted on the mirror head, either manually by a user or by means of an electric drive, the secondary detents 200, 220, 320, 340 in unison with the primary detent ramps 330A, 330B, 331A, 331B, 332A, 332B, 211A, 211B, 211C, 212A, 212B, and 212C all disengage and the case locking ring 100 is lifted in axial direction relative to the base locking ring 260. The locking rings 100, 260 can now be freely rotated relative to each other. During the rotation, the surfaces of the primary detents 210A, 210B, 210C of the case locking ring 100 slide on the surfaces of the primary detents 330A, 330B, 330C on the ring portion 300 of the base locking ring 260. Also during the rotation, when the surfaces of the primary detents 210A, 210B, 210C of the case locking ring 100 slide on the surfaces of the primary detents 330A, 330B, 330C of the base locking ring 260 there is clearance between the tops of the second set of secondary detents 340 and the surfaces of the primary detents 210A, 210B, 210C of the case locking ring 100 and there is clearance between the tops of the fourth set of secondary detents 220 and the surfaces of the primary detents 330A, 330B, 330C of the base locking ring 260 due to the height h1 being greater than h2. With this arrangement the raised secondary detents do not catch on the edges of the depressed secondary detents after wear occurs on the surfaces of the primary detents.

In an example, the secondary detents 200, 220, 320, 340 remain disengaged except at the normal operating position. That is, the primary detents 210A, 210B, 210C, 330A, 330B, 330C continue to slide against one another preventing the secondary detents 200, 220, 320, 340 from engaging as the mirror head moves to a folded position, and remain disengaged at the folded position. The movement of the mirror head can be reversed by exerting a low rotational force on the mirror head in the opposite direction. The mirror head can be moved back to its normal operating position, in which the first set of secondary detents 320 are engaged with the fourth set of secondary detents 220 and the second set of secondary detents 340 are engaged with the third set of secondary detents 200. All the detent ramps 330A, 330B, 331A, 331B, 332A, 332B, 211A, 211B, 211C, 212A, 212B, and 212C become engaged at this time as well.

In order to limit the movement range of the mirror head, the locking ring 260 may include a travel stop 440 which inserts into a guiding groove 460 of the locking ring 100, thus defining the possible rotational movement range of the locking rings 100, 260 relative to each other. The arrangement of the travel stop 440 and the guiding groove 460 may be interchanged so that the stopper 440 is on the case locking ring 100 and the guiding groove 460 is on the base locking ring 260.

In one example, the radius r2 described throughout different examples of the application can range from 20 mm to 55 mm, with a preferred range of 25 mm to 30 mm. The difference between r2 and r1 can range from 6 mm to 30 mm with a preferred range of 8 mm to 10 mm. The difference between r3 and r1 can range from 3 mm to 15 mm with a preferred range of 4 mm to 6 mm.

In at least one aspect, the height difference between height h1 and height h2, as described above, prevents the locking elements 200, 220, 320, 340 from catching one another during rotation. The difference between the height h1 and the height h2 can range from 0.1 mm to 1.5 mm. In a preferred example, the difference between the height h1 and the height h2 is 0.5 mm.

Figure 8:
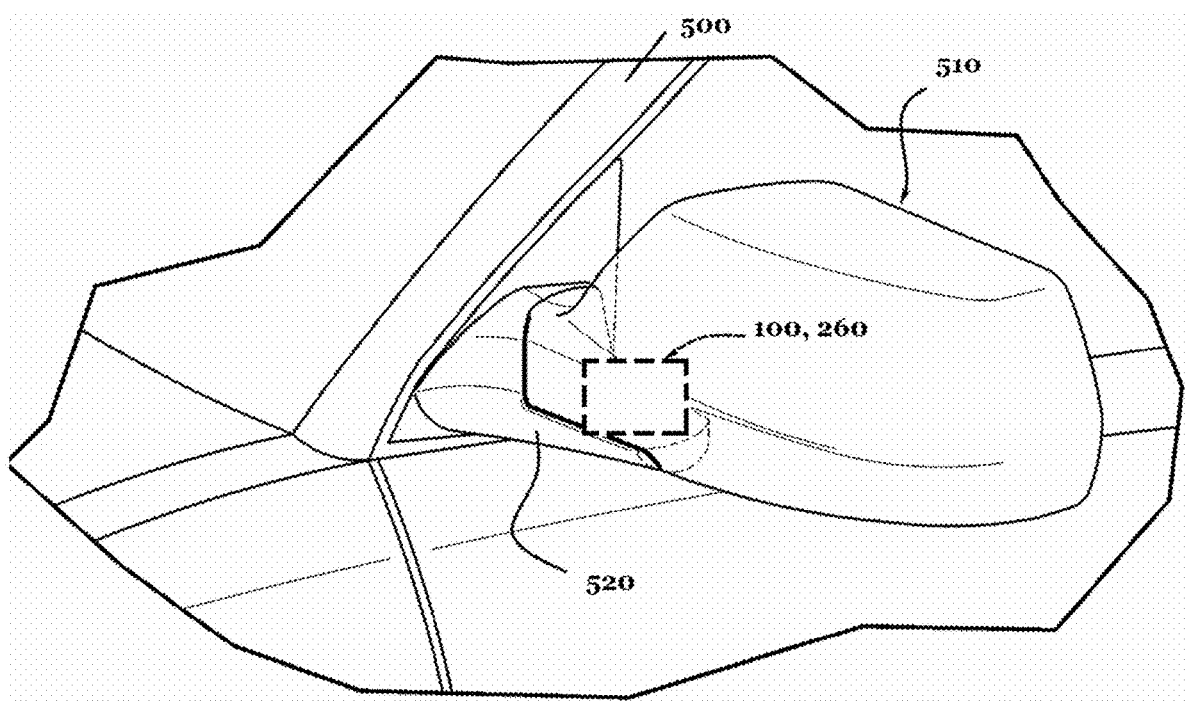
FIG. 8 is a diagram illustrating a vehicle such as a motor vehicle with a rearview device having one or more locking rings.

FIG. 8 is a diagram illustrating a vehicle such as a motor vehicle 500 with a rearview device having one or more locking rings 100, 260.

Referring to FIG. 8, a motor vehicle 500 includes a rear view device with a case portion 510 and a base portion 510. These portions are rotatably connected using structural elements that include one or more locking rings 100, 260. In an example, the locking rings 100, 260 described in reference with FIGS. 6 and 7 are used together as described above with the base locking ring 260 attached to the base portion 510 and the case locking ring 100 attached to the case portion 510.

In at least one aspect, a rear view device and locking discs which allow for a stable locking of the mirror head in its operational position and which minimize wear to the locking discs during the folding movement is described.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

What is claimed is:

1. A locking ring with a center axis for a rear view device, comprising:
    a set of elevated primary detents which extend radially from a first radial distance from the center axis to a second radial distance from the center axis, the set of elevated primary detents arranged in a circumferentially equidistant manner around the center axis;
    a first set of secondary detents positioned on the set of elevated primary detents which extend radially from the first radial distance from the center axis to a third radial distance from the center axis, the third radial distance being smaller than the second radial distance, the first set of secondary detents being arranged around the locking ring; and
    a second set of secondary detents, positioned on a planar recessed elevation, which extends radially from the first radial distance from the central axis to the third radial distance from the central axis, the second set of secondary detents being arranged around the locking ring.

2. The locking ring according to claim 1, wherein the set of elevated primary detents are elevated by a first height from the planar recessed elevation, a radially extending recess portion, or a raised ring portion of the locking ring,
    the second set of secondary detents are raised by a second height from the planar recessed elevation, the radially extending recess portion, or the raised ring portion of the locking ring, and
    the first height is greater than the second height.

3. The locking ring according to claim 2, wherein the difference between the first height and the second height is between 0.1 mm and 1.5 mm.

4. The locking ring according to claim 1, wherein the first set of secondary detents are arranged in first groups and the second set of secondary detents are arranged in second groups, and at least one of:
    the first groups and the second groups are arranged alternately, and the number of secondary detents in each of the first and second groups is at least one.

5. The locking ring according to claim 1, wherein the first set of secondary detents are depressed with respect to a surface of the set of elevated primary detents of the locking ring.

6. The locking ring according to claim 1, wherein the first set and the second set of secondary detents comprise a substantially V-shaped profile in a circumferential direction.

7. The locking ring according to claim 1, wherein at least one of the second radial distance is between 20 mm and 55 mm, a difference between the second radial distance and the first radial distance is between 6 mm and 30 mm, and a difference between the third radial distance and the first radial distance is between 3 mm and 15 mm.

8. A rear view device for a vehicle, comprising:
    a base portion comprising a first locking ring having a center axis; and
    a head portion comprising a second locking ring having a center axis, and being pivotable relative to the base portion around a pivot axis,
    wherein the center axis of the first locking ring is arranged coaxially with the pivot axis and the center axis of the second locking ring is arranged coaxially with the pivot axis, and at least one of the first and the second locking rings is the locking ring according to claim 1.

9. The rear view device according to claim 8, wherein the first locking ring comprises
    first primary detents of the set of elevated primary detents;
    first secondary detents of the first set of secondary detents; and
    second secondary detents of the second set of secondary detents; and
    the second locking ring comprises
    second primary detents having a same shape and configuration as the first primary detents;
    third secondary detents having a same shape and configuration as the first secondary detents and complementary to the second secondary detents; and fourth secondary detents having a same shape and configuration as the second secondary detents and complementary to the first secondary detents.

10. The rear view device according to claim 9, wherein the first primary detents project by a first height from a planar recessed elevation of the first locking ring,
the second primary detents project by the first height from a planar recessed elevation portion of the second locking ring,
the second secondary detents project by a second height from the planar recessed elevation of the first locking ring,
the fourth secondary detents project by a second height from the planar recessed elevation of the second locking ring, and
the first height is greater than the second height.

11. The rear view device according to claim 10, wherein the difference between the first height and the second height is between 0.1 mm and 1.5 mm.

12. The rear view device according to claim 9, wherein the first locking ring comprises an annular base portion and a ring portion extending axially from the annular base portion,
the ring portion extends in a radial direction from the first radial distance to the second radial distance, and
the first primary detents and the second secondary detents are arranged on the ring portion.

13. The rear view device according to claim 12, wherein the second locking ring comprises an annular base portion and a recess portion recessed axially relative to the annular base portion,
the recess portion extends in a radial direction from the first radial distance to the second radial distance, and
the second primary detents and the fourth secondary detents are arranged on the raised portion.

14. The rear view device according to claim 9, wherein the first secondary detents are depressed with respect to a surface of the first primary detents of the first locking ring, and the third secondary detents are depressed with respect to a surface of the second primary detents of the second locking ring.

15. The rear view device according to claim 9, wherein, in a first operational position of the rear view device, the first and second secondary detents are mutually engaged with the third and fourth secondary detents.

16. The rear view device according to claim 9, wherein a stopper provided by the first locking ring is configured to engage a guiding groove provided by the second locking ring in order to define a rotational movement range of the first or second locking ring relative to the other.

17. The rear view device according to claim 9, wherein the first primary detents of the first locking ring slide against the second primary detents of the second locking ring in response to a rotational movement of the first or second locking ring relative to the other.

18. The rear view device according to claim 8, wherein at least one of the second radial distance is between 20 mm and 55 mm, a difference between the second radial distance and the first radial distance is between 6 mm and 30 mm, and a difference between the third radial distance and the first radial distance is between 3 mm and 15 mm.

19. A motor vehicle with at least one rear view device according to claim 8.

20. A locking ring for a rear view device, comprising:
one or more primary detents elevated by a first height from a planar recessed elevation or a raised ring portion;
a first set of secondary detents forming depressions on the one or more primary detents; and
a second set of secondary detents forming protrusions which are raised by a second height from the planar recessed elevation or the raised ring portion of the locking ring,
wherein the difference between the first height and the second height is between 0.1 mm and 1.5 mm.

* * * * *